United States Patent Office 3,504,054
Patented Mar. 31, 1970

3,504,054
PYROCATECHOL ESTER OF PHOSPHORIC AND THIOPHOSPHORIC ACIDS AND PROCESS FOR MAKING SAME
Henning Cierpka, Frankfurt am Main, Germany, assignor to The Battelle Development Corporation, Columbus, Ohio
No Drawing. Filed Mar. 3, 1967, Ser. No. 620,236
Claims priority, application Germany, Mar. 4, 1966, B 86,074
Int. Cl. C07f 9/12, 9/18; A01n 9/36
U.S. Cl. 260—924       2 Claims

ABSTRACT OF THE DISCLOSURE

Substituted pyrocatechol esters of phosphoric and thiophosphoric acids having the formula:

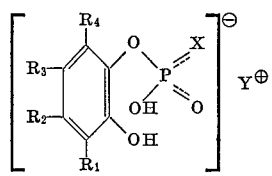

wherein not more than three of the groups $R_1$ to $R_4$ are hydrogen and wherein at least one of said groups may be halogen, nitro groups, sulfonic acid groups, sulfonamide groups and alkyl groups or wherein at $R_2$ and $R_3$ a benzene ring or a naphthalene ring is condensed onto the benzene nucleus of the pyrocatechol; X is oxygen or sulfur and Y is hydrogen or an alkali metal, ammonium or lower alkyl substituted ammonium cation have been found to have fungicidal properties. The esters are prepared by reacting at a temperature below 100° C. a cyclic pyrocatechyl phosphorus compound of the formula:

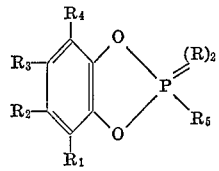

wherein $R_1$ to $R_4$ have the same meaning as above, R is sulfur, oxygen or halogen and $R_5$ is halogen or an acid anhydride radical with a compound of the formula $Y_n(X—H)_m$, wherein X and Y have the same meaning as above and $n$ and $m$ are integers from 1 to 3.

---

This invention relates to new organic compounds which are useful as fungicides.

The compounds of the invention are substituted pyrocatechol esters of phosphoric and thiophosphoric acid of the formula:

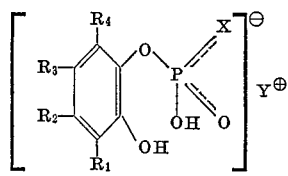

wherein not more than three of the R groups $R_1$, $R_2$, $R_3$, $R_4$, may be hydrogen and wherein otherwise the substituents $R_1$, $R_2$, $R_3$, and $R_4$ may be the same or different groups and are halogen, nitro groups, sulfonic acid groups, sulfonamide groups, alkyl groups, unsubstituted or substituted benzene radicals condensed onto the benzene nucleus of the pyrocatechol; X is oxygen or sulfur, and Y is hydrogen or a cation.

Only the completely unsubstituted pyrocatechol phosphoric acid of Formula II (Formula I: $R_1=R_2=R_3=R_4=Y=H$; $X=O$)

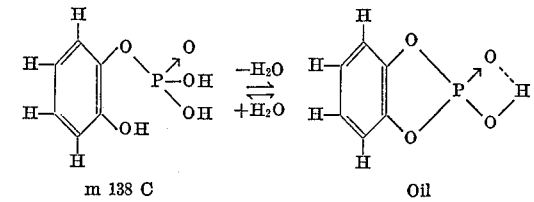

m 138 C     Oil is known (Genfresse, Comptes rendus, vol. 127, p. 522 (1898); E. Cherbuliez, Helv. chim. acta, vol. 34, p. 841, (1951)).

Said unsubstituted pyrocatechyl phosphoric acid has been prepared by heating pyrocatechol with phosphoric acid or phosphorus pentoxide at temperatures in excess of 200° C. It was found that this procedure cannot be applied to substituted pyrocatechols because the esters thus formed start decomposing already at temperatures just above 120° C. and certainly at about 200° C. For instance, phenanthrene hydroquinone phosphoric acid (I:$R_1+R_2$ and $R_3+R_4$=benzene radicals; X=O; Y=H) decomposes rapidly at temperatures above 120° C. with swelling, forming black resins and soluble phosphoric acids, Tetrachloropyrocatechyl phosphoric acid (I:$R_1$ to $R_4$=Cl) decomposes slowly at 120° C. and rapidly at 180° C., forming resins, fluorescent substances and soluble phosphoric acids.

The novel compounds of the invention are prepared as follows:

Cyclic pyrocatechyl phosphoric acid compounds of Formula III

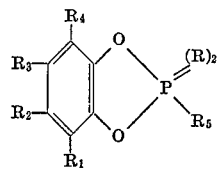

wherein $R_1$ to $R_4$ have the same meaning as above, $(R)_2$ is S, O, or (halogen)$_2$, and $R_5$ is a member of the group consisting of halogen, and acid anhydride radicals, particularly a pyrophosphate residue, are reacted at temperatures preferably below 100° C. with compounds of the general formula $Y_n(X—H)_m$ wherein X and Y have the same meaning as above, and $n$ and $m$ are integers from 1 to 3.

Suitable compounds $Y_n(X—H)_m$ are, for instance, water, hydrogen sulfide, alkali metal hydroxides, alkali metal hydrogen sulfides, ammonium hydroxides and N-substituted ammonium hydroxides (amines and water), hydroxides of polyvalent metals, but also metal and ammonium salts which in the presence of water decompose at least partially hydrolytically with formation of the respective hydroxides, such as triethyl ammonium acetate, Cu—II—acetate, or Fe—III—chloride.

The compounds are obtained by suspending the compounds III with the compounds $Y_n(X—H)_m$ in stoichiometric amounts or in excess of one of the components, simultaneously or even in considerable time intervals, in an inert solvent, whereby the compound $Y_n(X—H)_m$ can be applied in pure form or with other components of the same formula, e.g., as a stoichiometric amount of alkali metal hydroxide in a large quantity of water. The reaction can also be carried out by dissolving the reactants in an excess of water.

In contrast to the unsubstituted compound ($R_1$ to $R_4$=H), the novel substituted phosphoric and thiophosphoric acid esters of Formula I are excellent fungicides.

It is known that the o-quinones forming the base of the phosphoric acid esters of the invention, have by themselves a fungicidal effect, as described for phenanthrene quinone (F. J. Ascorbe, Caribbean Forester 14, 136 (1953), C. A. 48, 12225d; F. Fugikawa et al., J. pharm. Soc. Japan 72, 518 (1952) C. A. 46 2779i) or tetrachloro-o-benzoquinone (P.P.T. Sah, S. A. Peoples, Arzneimittel-forschung 11, 27 (1961)). Compared with said known fungicides, the novel compounds show a much greater fungicidal effect.

In the following table, the fungicidal effect of two of the novel compounds is compared with the data obtained with the well known water-soluble fungicide Na-pentachlorophenolate.

The comparative tests of the table were made with

A=Na-pentachlorophenolate
B=phenanthrene hydroquinone phosphoric acid
C=the triethyl ammonium salt of tetrachloropyrocatechyl thiophosphoric acid.

The tests were carried out as progressive dilution tests to determine the inhibiting effect on the development of the following fungi:

a=*Ustilago avenae*, in Sabouraud nutrient broth+yeast extract
b=*Phytophthora erythroseptica* in oatmeal nutrient broth
c=*Fusarium nivale* in Sabouraud nutrient broth
d=*Trichophyton mentagrophytes* in Sabouraud nutrient broth+yeast extract.

The determinations were made after 6 and 13 days, respectively, of incubation at 28° C.

TABLE

| Compound (molecular weight) | Molar concentration $\times.10^{-5}(X)$ | Test organism | | | | | | | |
|---|---|---|---|---|---|---|---|---|---|
| | | a | | b | | c | | d | |
| | | 6 | 13 | 6 | 13 | 6 | 13 | 6 | 13 |
| A (289.3) | 32 | − | − | − | − | − | − | − | − |
| | 16 | − | − | − | − | − | − | − | − |
| | 8 | − | − | − | − | − | − | − | − |
| | 4 | − | − | − | + | − | − | − | − |
| | 2 | − | − | − | + | − | − | − | − |
| | 1 | − | − | − | + | − | − | − | − |
| B (290.2) | 32 | − | − | − | − | − | − | − | − |
| | 16 | − | − | − | − | − | − | − | − |
| | 8 | − | − | − | − | − | − | − | − |
| | 4 | − | − | − | − | − | − | − | − |
| | 2 | − | − | − | − | − | + | − | − |
| | 1 | − | − | − | + | − | + | − | − |
| C (427.2) | 32 | − | − | − | − | − | − | − | − |
| | 16 | − | − | − | − | − | − | − | − |
| | 8 | − | − | − | − | − | − | − | + |
| | 4 | − | − | − | − | − | − | − | + |
| | 2 | − | − | − | + | − | − | (+) | + |
| | 1 | − | + | − | + | − | − | + | + |

Rating: −=complete inhibition; +=distinct growth; (+)= growth just detectable.

As the table shows, the compounds B and C have approximately the same or partly even a stronger effect on the tested microorganisms than I. In addition, they show less phytotoxicity on crop plants like cucumbers and tomatoes than A. The toxicity to warm-blooded animals is relatively low.

The compounds of Formula I are distinguished over most conventional fungicides not only by their considerably higher solubility in water and by their higher activity but also by the property of being excellent chelate formers. For instance, phenanthrene hydroquinone phosphoric acid forms a gray-violet difficultly soluble Cu-(II)- and an also difficultly soluble gray Fe-(III)-chelate. Tetrachloropyrocatechyl phosphoric acid forms a very difficultly soluble brownish-red Cu-(II)- and a somewhat more soluble dark violet Fe-(III)-chelate.

It is likely that the observed strong fungicidal effect is due, at least partially, to said chelating property because the substantially ineffective pyrocatechyl phosphoric acid possesses said property only to a low degree (e.g., it forms an unstable readily soluble violet Fe-III-chelate) or not at all (with Cu-II-acetate, only a light green solution is formed).

The also strongly active thiophosphoric acid esters of Formula I form with an excess of salts of heavy metals a mixture of sulfides and chelates of the respective phosphoric acids. It is known that esters of thiophosphoric acid may, in vivo, split off sulfur and be converted to the phosphoric acid esters which, in most cases, represent the form which is actually active.

It has also been found that a number of the novel compounds, e.g., the 4-n-hexyl pyrocatechyl phosphoric acid, are excellent emulsifiers. Said fungicidal compounds can, therefore, be used in biocidal compositions to replace emulsifiers.

The following examples are given by way of example. Other derivatives differently substituted can be prepared accordingly.

EXAMPLE 1

Phenanthrene hydroquinone monophosphoric acid (IV)

10 ml. of anhydrous acetone are added dropwise to a gently boiling solution of 34.5 g. of phenanthrene hydroquinone phosphorus trichloride in 300 ml. of carbon tetrachloride. There is obtained with strong development of gaseous hydrogen chloride, phenanthrene hydroquinone cyclophosphoryl chloride (V) which, due to its low solubility in most organic solvents, starts to precipitate already at boiling temperature.

After boiling for two hours, part of the solvent is distilled off, the mother liquor is cooled, and the precipitating crystal sludge is filtered with exclusion of moisture under nitrogen. The yield of (V) is 27.2 g.

Under careful exclusion of water, the compound can be sublimed at 200° C. and 0.1 mm. Hg and forms then long white needles (M.P. 210–211° C.) which, when protected against moisture and light, are stable at 20° C. for an unlimited period of time.

The compound IV is prepared as follows: Fresh powdered and not further purified V is mixed with five times its weight of water, the obtained slurry is stirred a few minutes at 20° C., and the produced fine white flakes are centrifuged and freed from the adhering aqueous hydrochloric acid in a current of nitrogen or in vacuo over sodium hydroxide. The yield of IV is 90 percent of theory, calculated on V. If only one mole of water is added to two moles of V, in an inert solvent, the white, dimerous anhydride of IV can be isolated.

IV contains crystal water, melts with discoloration below 140° C. and can be stored in sealed flasks in the dark for unlimited periods of time. At a pH below 1.0, it forms in water difficultly soluble flakes; up to a pH of 3, the solutions in water, alcohol and acetone show blue fluorescence. At a pH of 4.0 to 9.0, the fluorescence is white, and above pH=12 it is yellow.

IV is readily soluble in dimethyl formamide, dimethyl sulfoxide, ethanol, glacial acetic acid, acetic acid ester, and aqueous acetone; it is less soluble in water, only little in absolute chloroform and ether, and relatively difficultly soluble in aqueous mineral acids below pH 1. The acid IV forms a monosodium salt, which is readily soluble in acetone, and a disodium salt, which is insoluble in acetone.

The compound forms an ether adduct melting, with decomposition, at 125–128° C.

Calc'd. for $C_{14}H_{11}PO_5 \cdot C_4H_{10}O$ (percent): C, 59.34; H, 5.82; P, 8.00. Found (percent): C, 58.13; H, 5.60; P, 8.7.

EXAMPLE 2

4-chloropyrocatechyl thiophosphoric acid triethyl ammonium salt 2.41 g. (10 moles) of 4-chloropyrocatechyl phosphorus thiochloride (B.P.$_{.14}$ 134° C.; $n_D^{23}$ 1.5933, M.P. 25–26° C.) in 10 ml. of ether are added dropwise at 0° C. with vigorous stirring to 2.2 g. (22 mmoles) of triethylamine, 1.3 g. (22 mmoles) of glacial acetic acid, and 0.5 ml. of water in 25 ml. of ether. On further cooling, the milky suspension crystallizes, whereupon the crystals are filtered, freed from ether, and recrystallized from very little water.

The yield is 2.9 g. (90% of theory) in form of scaly crystals melting at 73.5–74.5° C.

The compound is soluble in water and is decomposed on prolonged boiling with formation of H₂S. The salt is very readily soluble in alcohol, benzene, and in hot dioxane and acetone, but insoluble in ether, petroleum ether and cyclohexane.

Also the heavy metal salts (Pb″, Hg′, Cu″) decompose more or less rapidly with formation of the corresponding sulfides.

Calc'd for triethylammonium salt $C_{12}H_{19}ClNO_3PS$ (percent): N, 4.33; S, 9.90; Cl, 10.95. Found (percent): N, 4.45; S, 9.87; Cl, 10.82.

EXAMPLE 3

Tetrachloropyrocatechyl phosphoric acid, potassium salt

Tetrachloropyrocatechyl phosphorus trichloride is obtained from tetrachloropyrocatechyl phosphorus monochloride and chlorine or from tetrachloro-o-benzoquinone and PCl₃. It has a melting point of 118–121° C. and sublimes at 0.1 mm. Hg at 80–110° C.

2.8 g. (7.3 mmoles) of the tetrachloropyrocatechyl phosphorus trichloride, dissolved in 10 ml. of absolute dioxane, are added very quickly as a thin stream to a solution of 1.63 g. (29.2 mmoles) of KOH in 10 ml. of ice cold water with good stirring and cooling. After temporary dark discoloration, a light colored solution is formed which has a weakly acid to neutral reaction. The aqueous dioxane is distilled off in vacuo and the residue is digested with 5 ml. of warm water to remove the KCl, cooled and filtered. This procedure is repeated, and finally a residue is obtained which consists of white needles which, dried in vacuo at 100° C., weigh 2.4 g. (=94.5%, of theory). Advantageously, the separation can be carried out also with absolute alcohol in which KCl is insoluble. On rapid heating, the substance melts at 188–190° C. with decomposition and red discoloration; on slow heating, the decomposition starts above 150° C.

In hot water, the salt is soluble in a proportion of 1:30; in cold water it is only moderately soluble. It can be detected even in very small amounts by addition of Cu-(II)-acetate whereby flakes of a brownish-red Cu-(II)-chelate precipitate.

The corresponding tetrachloropyrocatechyl phosphoric acid can be obtained from the potassium salt by the usual procedure or also by hydrolyzing tetrachloropyrocatechyl phosphorus oxychloride (M.P. 135–138° C.) with water or the equivalent amount of KOH in water. The acid is readily soluble in water, ether, and dioxane, little soluble in absolute chloroform, and insoluble in petroleum ether. Recrystallized form ether-chloroform (1:5), the acid forms needles melting at 150–155° C. with decomposition.

EXAMPLE 4

2,3-dihydroxynaphthalenemonothiophosphate 20 g. of 2,3-dihydroxynaphthalene were heated at boiling temperature for 25 hours with ten times the molar equivalent of phosphorus trichloride. The volatile components were drawn off in vacuo and the remaining residue was distilled. There were obtained 18.3 g.=65% of 2,3-dihydroxynaphthalene phosphorus monochloride

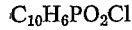

(Bp.₀.₅ 148° C.; M.P. 135–137° C.; flakes). 137 g. of this compound were mixed with 2.2 g. of sulfur and heated for 1 hour at 190° C. After sublimation in a high vacuum, 2,3-dihydroxynaphthalene phosphorus thiochloride

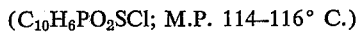

was obtained in an amount of 14.9 g.=95%. In the manner described in Example 2, this compound was hydrolized with triethylammonium acetate in benzene and addition of a small amount of water; thereby, the pure triethylammonium salt of the 2,3-dihydroxynaphthalene monothiophosphoric acid was obtained in a yield of 90 percent.

Calc'd for $C_{16}H_{22}NO_3PS$ (percent): S, 9.45; N, 4.13. Found (percent): S, 9.90; N, 4.30.

The compound can be recrystallized from alcohol and melts at 127–128.5° C. (needles).

EXAMPLE 5

Phenanthrene hydroquinone monothiophosphate

Phenanthrene hydroquinone is boiled with 11 times the molar equivalent of phosphorus trichloride for 90 hours. After drawing off the phosphorus trichloride, the residue is sublimed in high vacuum. Phenanthrene hydroquinone phosphorus monochloride ($C_{14}H_8ClO_2P$; sublimes at 160° C./0.5 mm. Hg; M.P. 176–182° C.) was obtained in 53% yield and was heated with 1.1 times the molar equivalent of sulphur for 1 hour at 190° C. There was obtained, in a yield of 70.5 percent, phenanthrene hydroquinone phosphorus thiochloride, $C_{14}H_8ClO_2PS$, needles, M.P. 170–172° C., sublimes at 100° C. at 0.2 mm. Hg.

Elementary analysis.—Calc'd for (percent): C, 54.82; H, 2.63; P, 10.1; S, 11.56; Cl, 10.46. Found (percent): C, 55.65; H, 2.65; P, 10.4; S, 11.23; Cl, 11.1.

The reaction with triethylammonium acetate and water proceeds as in Example 2. The triethylammonium salt of phenanthrene hydroquinone monothiophosphoric acid solidifies at 207–208° C. (needles form ethanol), yield 82%.

Calc'd for $C_{20}H_{24}NO_3PS$ (percent): C, 61.67; H, 6.21; N, 3.60; S, 8.23. Found (percent): C, 62.44; H, 6.41; N, 3.85; S, 8.8.

EXAMPLE 6

3.5-dichloropyrocatechylmonothiophosphate 3.5-dichloropyrocatechol is boiled for 120 hours with 8 times the molar equivalent of phosphorus trichloride and converted in 45% yield to 3.4-dichloropyrocatechyl phosphorus monochloride. $C_6H_2Cl_2O_2P$ (B.P. 75° C./0.2 mm. Hg, $n_D^{25}$ 1.5951). Addition of S at 190° C. produces in 91% yield the thiochloride $C_6H_2Cl_3O_2PS$ (B.P. 96–98° C. at 0.3 mm. Hg. M.P. 69° C.).

This compound can be hydrolyzed with triethylammonium acetate in benzene and water as described in Example 2. There is obtained in a yield of 70%, the triethylammonium salt of the 3.5-dichloropyrocatechyl monothiophosphoric acid. It solidifies at 115–116° C. (flakes from ethanol-ether).

Calc'd for $C_{12}H_{18}Cl_2NO_3PS$ (percent): Cl, 19.80; N, 3.91. Found (percent): Cl, 20.1; N, 3.5.

EXAMPLE 7

Tetrachloropyrocatechyl monothiophosphate

Tetrachloropyrocatechol is boiled for 12 hours with the 1.5 molar amount of phosphorus trichloride in ether. After distilling off the volatile components, tetrachloropyrocatechyl phosphorus monochloride $C_6Cl_5O_2P$ can be obtained in 60% yield, B.P.₀.₅ 134–136° C., M.P. 114–115° C. With the equimolar amount of sulfur, the monochloride is converted at 190° C. to the thiochloride, yield 80%.

Calc'd for $C_6Cl_5O_2PS$, M.P. 184–186° C., B.P.₀.₃ 140–142° C. (percent): P, 9.0; Cl, 51.5; S, 9.3. Found (percent): P, 9.3; Cl, 49.9; S, 10.1.

The triethylammonium salt of the tetrachloropyrocatechyl monothiophosphoric acid $C_{12}H_{16}Cl_4NO_3PS$ is obtained as described in Example 2 in 83% yield and crystallizes as needles from ethanol; M.P. 136–137° C.

Calc'd for (percent): Cl, 33.2; S, 7.5; N, 3.28. Found (percent): Cl, 33.3; S, 8.1; N, 3.0.

EXAMPLE 8

Tetrabromopyrocatechyl monothiophosphate

In a manner analogous to that set forth in Example 7, tetrabromopyrocatechol is converted to the phosphorus monochloride $C_6Br_4ClO_2P$. Yield 43%; M.P. 160–165° C., needles; B.P.$_{0.5}$ 180–185° C.

Addition of sulfur at 190° C. produces in 73% yield the phosphorus thiochloride.

Calc'd for $C_6Br_4ClO_2PS$, M.P. 184–186° C., B.P.$_{0.3}$ 195–199° C. (percent): C, 13.80; H, 0.0; Cl, 6.8; Br, 61.3; S, 6.2. Found (percent): C, 14.02; H, 0.0; Cl, 6.2; Br, 62.1; S, 6.3.

The conversion to the triethylammonium salt of the tetrabromopyrocatechylmonothiophosphoric acid is carried out as in Example 2, yield 78%. Needles from ethanol, M.P. 169–171° C.

Calc'd for $C_{12}H_{16}Br_4NO_3PS$ (percent): C, 23.82; H, 2.67; Br, 52.84; N, 2.32. Found (percent): C, 23.77; H, 2.72; Br, 53.1; N, 2.4.

EXAMPLE 9

4-n-hexylpyrocatechylphosphate 20 g. of 4-n-hexylpyrocatechyl phosphorus monochloride (B.P.$_{0.3}$ 115–116° C; $n_D^{20}$ 1.5290; prepared from 4-n-hexylpyrocatechol and phosphorus trichloride) were dissolved in 60 ml. of absolute $CCl_4$, and solution of 3.9 g. $N_2O_4$ in 60 ml. of $CCL_4$ was added dropwise to said solution at 20–35° C. The residual nitrogen oxides were removed by a current of argon, and the obtained 4-n-hexylpyrocatechyl phosphorus oxychloride (B.P.$_{0.2}$ 136–137° C.; $n_D^{20}$ 1.5050), which can be isolated was hydrolyzed without separation directly in the reaction solution with 5.4 g. of water at 0.5° C. After removal of the solvent under reduced pressure, there remained a syrup which did not crystallize. Therefore, the 4-n-hexylpyrocatechylphosphoric acid was adjusted with 10% NaOH to a pH 5, and the strongly foaming solution was concentrated, whereby the monosodium salt was obtained in amorphous form. By extraction with alcohol or acetone, it could be separated and recovered as pure salt. The $Rf$ value of the acid in the thin layer chromatogram on cellulose with isopropanol—12.5% $NH_3$—water (7:1:2) is 0.73.

EXAMPLE 10

X-bromo-4-n-hexylpyrocatechylphosphate 12.9 g. of 4-n-hexylpyrocatechyl phosphorus monochloride were converted in 30 ml. of absolute $CCl_4$ at 0 to 5° C. first with the equimolar amount of bromine (8 g.) in 10 ml. of $CCl_4$ to the 4-n-hexylpyrocatechyl phosphorus trichloride. The observed yellow solution, which did not longer contain free bromine, was heated to boiling temperature, and then additional 8 g. of bromine were added dropwise. A red solution was produced which consumed bromine only slowly. After a total of 4 hours, the free bromine had disappeared. Then 6 g. of acetone were added to the solution whereby HBr was vigorously developed and the solution assumed a lighter color. After cooling to 0° C., 1.8 ml. of water were added dropwise, and the solution was concentrated in vacuo. There remained a reddish syrup to which 50 ml. of water were added. Two layers were formed. The upper aqueous layer (32 ml.) was rejected; to the lower layer which now dissolved in additional water (pH 1) there was added 30 ml. of 10% NaOH, and the obtained strongly foaming light colored solution (pH 4.8) was filtered from brownish flakes and dried in vacuo. After addition of very little acetone, the amorphous residue crystallised to the monosodium salt of the X-bromo-4-n-hexylpyrocatechyl phosphoric acid which in chromatographical investigation (Cellulose; isopropanol—12.5% $NH_3$—water=7:1:2) proved to be essentially uniform. Under these conditions, the free acid showed the $Rf$ value 0.57.

EXAMPLE 11

4-tert. butylpyrocatechyl monothiophosphate 4-tert. butylpyrocatechol is boiled with 10 times the molar amount of phosphorus thiochloride until development of hydrogen chloride is terminated, and the obtained 4-tert. butyl pyrocatechyl phosphorus thiochloride is distilled; B.P.$_{0.2}$ 100–101° C, $n_D^{25}$ 1.5523. Yield 87% of theory.

In order to obtain the triethylammonium salt of the 4-tert. butylpyrocatechyl thiophosphoric acid, the excess phosphorus thiochloride is distilled off and the reaction produced can be directly hydrolyzed with triethylammonium carbonate in water, obtained by throwing Dry Ice into a stirred suspension of triethylamine and water. After the hydrolyzate has been stirred for 2 hours at 30° C. it is concentrated in vacuo to dryness, the triethylamine hydrochloride is extracted with a small amount of water, and the residue (80% of theory) is dissolved in a small amount of ethanol and precipitated as needles with the eight-fold amount of ether; M.P. 101–102° C.

Calc'd for $C_{16}H_{28}NO_3PS$ (percent): C, 55.62; H, 8.17; N, 4.05; S, 9.28. Found (percent): C, 57.04; H, 8.28; N, 4.15; S, 9.60.

EXAMPLE 12

3,4-di-tert. butylpyrocatechyl thiophosphate 11 g. of di-tert. butylpyrocatechol and 275 g. of phosphorus trichloride are boiled for 120 hours, and the obtained 3,5-di-tert. butylpyrocatechyl phosphorus monochloride, $C_{14}H_{14}ClO_2P$, is then distilled in vacuo. It is a viscous oil, B.P.$_{0.2}$ 100–105 °C., $n_D^{28}$ 1.5236.

By addition of sulfur at 200° C. (2 hours), 3,5-di-tert. butylpyrocatechyl phosphorus thiochloride, $C_{14}H_{14}ClO_2PS$ is obtained in 82% yield. It is a viscous oil (B.P.$_{0.2}$ 125–128° C., $n_D^{23}$ 1.5358) which solidifies on prolonged standing (M.P. 75–76° C.). Hydrolysis with triethylammonium acetate in ether in the presence of a small amount of water produces the triethylammonium salt of the di-tert. butylpyrocatechyl thiophosphoric acid as an ether soluble substance, M.P. 88–89° C. (needles from benzene-petroleum ether 1:4). Yield 67% of theory.

Calc'd for $C_{20}H_{36}NO_3PS$ (percent): C, 59.81; H, 9.04; N, 3.49; S, 7.99. Found (percent): C, 59.76; H, 9.16; N, 3.40; S, 8.36.

EXAMPLE 13

4-n-butylpyrocatechylphosphate 7 g. of $Br_2$ in 20 ml. of $CCl_4$ are added dropwise at 0 to 5° C. to a solution of 10 g. of 4-n-butylpyrocatechyl phosphorus monochloride (B.P.$_{0.1}$ 90° C.; $n_D^{22}$ 1.5373; prepared from 4-n-butylpyrocatechol and $PCl_3$) in 20 ml. of $CCl_4$ with stirring, and the 4-n butylpyrocatechyl phosphorus trichloride, obtained in exothermic reaction, is converted, without separation, by short boiling with 5 g. of absolute acetone to 4-n-butylpyrocatechyl phosphorus oxychloride. The solvent and by-products (HBr, 2-bromopropene, and 2,2-dibromopropane) are distilled off in vacuo; the residue (12 g.) is diluted with toluene, and 1.6 ml. of water are added with stirring and cooling. Two layers form, and the lower layer containing the reaction product is separated and freed of the solvent residues in vacuo. There remains slightly yellowish 4-n-butylpyrocatechyl phosphoric acid which cannot be brought to crystallization. Therefore, NaOH is added to a pH 4.5, and the crystalline monosodium salt is obtained in concentration. It is chromatographically uniform. (Thin layer chromatography in cellulose; isopropanol—12.5% $NH_3$—water 7:1:2.)

The compounds of the present inventions find particular utility as fungicides and may be applied in a variety of ways in various amounts and concentrations. They may be combined with other biocides and suitable carriers and applied, e.g., as dusts or sprays.

I claim:
1. Substituted pyrocatechyl esters of the formula

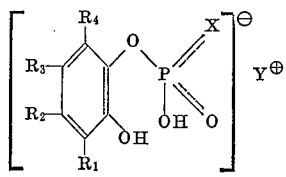

wherein not more than three of the groups $R_1$ to $R_4$ are hydrogen and wherein at least one of said groups is a member of the class consisting of chlorine, bromine and alkyl groups containing up to 6 carbon atoms or wherein at $R_2$ and $R_3$ a benzene ring or a naphthalene ring is condensed onto the benzene nucleus of the pyrocatechol; X is a member of the group consisting of oxygen and sulfur; and Y is a member of the group consisting of hydrogen and alkali metal, ammonium and lower alkyl substituted ammonium cations.

2. The method of preparing substituted pyrocatechyl esters of the formula:

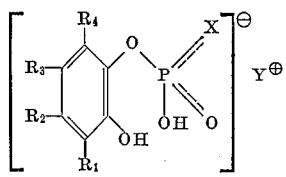

wherein not more than three of the groups $R_1$ to $R_4$ are hydrogen and wherein at least one of said groups is a member of the class consisting of chlorine, bromine and alkyl groups containing up to 6 carbon atoms or wherein at $R_2$ and $R_3$ a benzene ring or a naphthalene ring is condensed onto the benzene nucleus of the pyrocatechol; X is a member of the group consisting of oxygen and sulfur; and Y is a member of the group consisting of hydrogen and alkali metal, ammonium and lower alkyl substituted ammonium cations which method comprises reacting at a temperature below 100° C. a cyclic pyrocatechyl phosphorus compound of the formula:

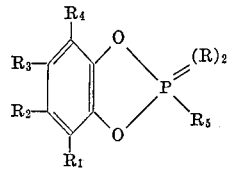

wherein $R_1$ to $R_4$ have the same definitions as above, $(R)_2$ is a member of the group consisting of sulfur, oxygen and (halogen)$_2$ wherein the halogen is chlorine or bromine and $R_5$ is a member of the group consisting of chlorine, bromine and a pyrocatechyl phosphate radical, with a compound of the formula $Y_n(X-H)_m$ wherein X and Y have the same definitions as above and $n$ and $m$ are integers from 1 to 3.

References Cited
UNITED STATES PATENTS 3,118,876    1/1964    Akita et al. _____ 260—953 XR CHARLES B. PARKER, Primary Examiner A. H. SUTTO, Assistant Examiner U.S. Cl. X.R.

260—435, 431, 438.1, 927, 953, 983; 424—217